United States Patent [19]

Mercader et al.

[11] Patent Number: 4,797,141
[45] Date of Patent: Jan. 10, 1989

[54] METHOD FOR OBTAINING $CO_2$ AND $N_2$ FROM INTERNAL COMBUSTION ENGINE OR TURBINE GENERATED GASES

[75] Inventors: Juan P. Mercader; Pablo R. Villamanan, both of Barcelona, Spain

[73] Assignee: Carburos Metalicos S.A., Barcelona, Spain

[21] Appl. No.: 88,805

[22] Filed: Aug. 24, 1987

[30] Foreign Application Priority Data

Apr. 21, 1987 [ES] Spain ................................ 8701147

[51] Int. Cl.$^4$ ................................................ F25J 3/00
[52] U.S. Cl. .......................................... 62/17; 60/320; 62/87; 423/212
[58] Field of Search ....................... 423/212; 62/87, 17, 62/18; 60/320

[56] References Cited

U.S. PATENT DOCUMENTS

| | | | |
|---|---|---|---|
| 984,605 | 2/1911 | Reichel et al. | 423/437 |
| 1,150,337 | 8/1915 | Brownlee et al. | 423/220 |
| 2,665,190 | 1/1954 | Congdon et al. | 423/235 |
| 3,002,362 | 10/1961 | Morrison | 62/87 |
| 3,735,601 | 5/1973 | Stannard, Jr. | 62/87 |
| 3,812,236 | 5/1974 | Adams et al. | 423/237 |
| 4,079,117 | 3/1978 | Butwell | 423/228 |
| 4,081,510 | 3/1978 | Kato et al. | 423/227 |
| 4,184,855 | 1/1980 | Butwell et al. | 55/48 |
| 4,263,263 | 4/1981 | Vaseen | 423/212 |
| 4,293,322 | 10/1981 | Ryan et al. | 62/17 |
| 4,364,915 | 12/1982 | Proctor | 423/437 |
| 4,440,731 | 4/1984 | Pearce | 423/228 |
| 4,477,419 | 10/1984 | Pearce et al. | 423/228 |
| 4,491,566 | 1/1985 | Adams et al. | 423/220 |
| 4,510,124 | 4/1985 | Sears et al. | 423/437 |
| 4,522,636 | 6/1985 | Markbreiter et al. | 62/87 |
| 4,624,839 | 11/1986 | Wolcott et al. | 423/228 |
| 4,696,689 | 9/1987 | Mori et al. | 62/87 |
| 4,704,146 | 11/1987 | Markbreiter et al. | 62/17 |
| 4,711,093 | 12/1987 | Markbreiter et al. | 62/87 |
| 4,729,879 | 3/1988 | Black | 423/212 |

Primary Examiner—Ronald C. Capossela
Attorney, Agent, or Firm—William W. Haefliger

[57] ABSTRACT

The method consists of recovering heat contained in the combustion gases in a first heat exchanger or boiler, recovering the heat given off by the engine or turbine in the form of steam and/or hot water, leading the previously cooled, in a second heat exchanger, combustion gases to a pressure gas holder, impelling the gases to a washing and cooling column and passing them through $CO_2$ absorption columns wherein this latter is picked up whereas the remainder of gases, specially $N_2$, are left free, and conventionally performing the steps for obtaining both gases. For performing all of the obtention procedure, use is made of only the combustion generated energy, thus thoroughly recovering the above gases with a whole benefit of the energy contributed by the hydrocarbons.

21 Claims, 1 Drawing Sheet

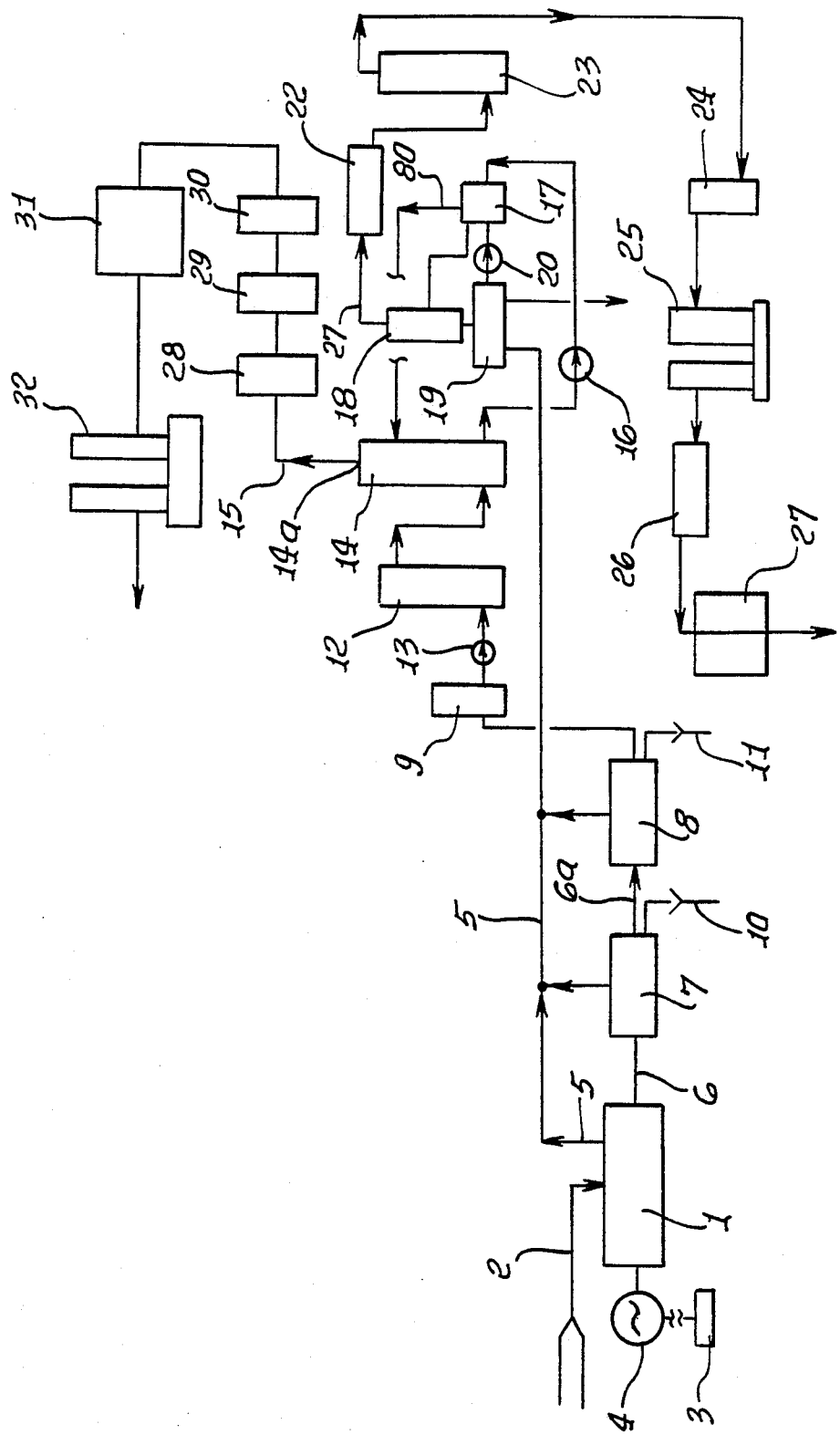

METHOD FOR OBTAINING CO₂ AND N₂ FROM INTERNAL COMBUSTION ENGINE OR TURBINE GENERATED GASES

BACKGROUND OF THE INVENTION

The present invention relates to a method for obtaining $CO_2$ and $N_2$ from the gases generated in the operation of an internal combustion engine, or turbine.

$CO_2$ is normally obtained as a by-product in processes for producing ammonia, gasolines, fermentations and carbonate decompositions, although $CO_2$ purification is difficult and costly.

In the industrial procedure of making liquid carbon dioxide one is able to distinguish five well defined phases crude gas generation, purification, compression and liquefaction, drying and rectification distillation.

In the generation phase, use is made of liquid fuels such as fuel-oil, or solid fuels such as good grade anthracites, coke, charcoal, etc., as raw materials, with care always taken for obtaining good combustion with excess atmospheric oxygen in order to make easier the complete oxidation of carbon:

$$C + O_2 \rightarrow CO_2 + \text{heat.} \tag{1}$$

Purification of the gases issuing from combustion involves effecting several essential treatments for the enrichment of $CO_2$ until a volume concentration of 99.90% results. These treatments can be separate, as in: washing, absorption, desorption and stripping reducing substances off.

Washing is performed by means of a fresh water shower removing solids (soot, carried off ashes, etc.) and which at the same time cools the combustion gases and removes as well the sulfurous anhydride issuing from the sulfur contained in the fuel used for the generation. A second washing is effected with a Solvay soda diluted solution to reduce the primary gas contents to nitrogen, oxygen and $CO_2$.

The washed gases are then caused to circulate through Raschig ring filled towers at the inside of which they meet with a counter-stream shower of absorbing solutions of potassium carbonate, monoethanolamine, etc. Potassium carbonate combines itself with one molecule of $CO_2$ and one molecule of water, thus being converted into bicarbonate according to the following reversible reaction:

$$CO_3K_2 + H_2O + \rightarrow 2CO_3HK. \tag{2}$$

Pure $CO_2$ desorption, or giving off, is effected by heating the $CO_2$ saturated solutions over 100° C. by taking advantage of the heat evolved in the combustion.

A last purifying treatment is performed as the $CO_2$ passes through towers at the inside of which oxidizing solutions are made to recirculate, thus stripping off the traces of organic impurities eventually carried off with the gas.

In this manner, $CO_2$ is ready for passing to the third, i.e. compression phase in which pressures in the range of 15 to 20 atm are reached by means of dry piston compressors. Thereafter the $CO_2$ is cooled and liquefied by means of classical cooling networks, using ammonia, Freon, etc., lowering its temperature until the liquefying required pressure, is reached.

The thus obtained liquid $CO_2$ has been previously freed from another impurity, the saturation water, most of which has already been removed in the intermediate and final coolers of the compression stage. Finally a strong drying is performed in special towers filled with highly deliquescent substances, which are regenerated again before they reach moisture saturation.

Finally, rectification has the purpose of eliminating the small amount of air gases (nitrogen, oxygen, argon) that had accompanied $CO_2$ through all of the procedure. When this phase has been surmounted, the $CO_2$ acquires a purity higher than 99.9% in volume.

Nitrogen isolating methods can be assembled in two classes: separation from the atmosphere, and nitrogenated compound decomposition. Industrial production methods consist of fractional distillation of liquid air.

Nitrogen with about 1% argon and traces of other inert gases can be obtained by chemically separating oxygen, carbon dioxide and water vapour from atmospheric air by means of suitable chemicals. The following chemical reactions have been used as well for the preparation of nitrogen:

When a saturated solution of sodium nitrite is mixed with a solution of ammonium chloride, the reaction is:

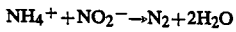

$$NH_4^+ + NO_2^- \rightarrow N_2 + 2H_2O \tag{3}$$

Ammonia, in gas form, is oxydized by passing it through bromine water, and the thus resulting gaseous mixture is thereafter separated by passing it through different reagents which absorb the unreacted bromine, water vapor and ammonia. The reaction is as follows:

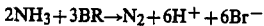

$$2NH_3 + 3BR \rightarrow N_2 + 6H^+ + 6Br^- \tag{4}$$

Another method for obtaining nitrogen consists of heat reacting ammonia gas with metal oxides, for example:

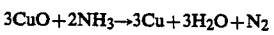

$$3CuO + 2NH_3 \rightarrow 3Cu + 3H_2O + N_2 \tag{5}$$

The above are methods presently used for the isolation of $CO_2$ and $N_2$. Internal combustion engines or turbines do burn hydrocarbons to generate electricity, steam and/or hot water and combustion gases. Produced heat is generally used to take advantage of it, whereas the combustion gases are discarded.

DESCRIPTION OF THE INVENTION

In the method according to the invention, combustion gases are utilized to obtain $CO_2$ and $N_2$, and the evolved energy is employed for so obtaining $CO_2$ and $N_2$.

The steps of the method include:

(a) recovering heat from the hot exhaust gas, thereby to cool the gas, (b) stripping $CO_2$ from the cooled gas and compressing and liquifying the $CO_2$, (c) thereafter purifying the remaining cooled gas to remove contaminates, thereby to recover pure $N_2$, and compressing and liquifying said $N_2$, (d) the energy required for said (b) and (c) steps being derived from said (a) step heat recovery.

More specifically, the method according to the invention includes recovering heat contained in the combustion gases in a first heat exchanger or boiler; recovering the heat evolved by the engine or turbine in the form of steam and/or hot water; leading the combustion gases, previously cooled in a second heat exchanger, to a pressure gas holder; impelling the said gases through a washing and cooling column; circulating the said gases through $CO_2$ absorption columns wherein $CO_2$ is picked up in the form of a carbonated solution, the remainder of gases, specially $N_2$, becoming free; performing on one side the steps of regeneration of the carbonated solution, compression and liquefaction and drying of $CO_2$, and on the other hand the steps of decarbonating, deoxygenating, purification, drying, compression and liquefaction of $N_2$; the whole procedure of obtaining $CO_2$ and $N_2$ being performed solely (or substantially solely) with the use of the energy contained in the vapor and/or hot water and the combustion gases themselves, thus wholly recovering the said gases with a thorough benefit of the energy brought forward by the hydrocarbons.

Preferably, the temperature of the combustion gases drops in the first heat exchanger from 500°-600° C. to 150°-170° C., the gas pressure within the gas holder is at or about 0.05 Bar, and the temperature of the gases within the scouring and cooling column drops from 150° C. down to between 50° C. and 60° C.

Process efficiency is high, since, for every 500 $NM^3$ of natural gas some 1000 Kg $CO_2$ and some 5000 Kg $N_2$ are obtained.

On the other side, energy efficiency is about 85% since the sole energy losses are those of the radiation heat, recovery of the combustion gases being over 85% since the sole losses are due to venting in the gas purification procedures.

It appears from the above that the method of the invention provides for a thorough recovering of $CO_2$ from the combustion gases, as well as $N_2$, through chemical and physical procedures taking a total advantage of the energy contributed by the fuel. The invention thus provides a new method for obtaining the said gases, as well as an important energy saving or utilization.

BRIEF DESCRIPTION OF THE DRAWINGS

For a better understanding of the above exposition, diagrammatic drawings are enclosed showing a practical embodiment.

In the drawings, the single FIGURE shows a flow-chart of the network for practicing the method for obtaining $CO_2$ and $N_2$ starting from the combustion gases issuing from an endothermic engine or turbine, the fuel hydrocarbon being natural gas. Use of this fuel is specially recommended because of the economical advantages that it does offer in most industrial countries.

DESCRIPTION OF PREFERRED EMBODIMENT

As it may be seen in the FIGURE, engine 1 uses natural gas supplied at 2 and drives alternator 4 to generate electricity at 3. The engine generates, as well, steam and/or hot water 5 and combustion gases 6.

Combustion gases carry $CO_2$ and $N_2$, the latter deriving from the air used in the combustion. The gases issue at a high temperature from the engine 1, and the energy carried by them is to be used for obtaining $CO_2$ and $N_2$.

Heat evolved by the engine or turbine is recovered at the outlet 5 of engine 1 as steam and/or hot water. Heat contained in the combustion gases 6 is recovered at a first heat exchanger or boiler 7 wherein heat is transferred to the steam 5. The temperature of gases within exchanger or boiler 7 drops from 500°-600° C. down to 150°-170° C.

The combustion gases 6a are further cooled within a second heat exchanger 8 and thereafter driven to an accumulator or gas holder 9 at a pressure of 0.05 Bar. The heat exchangers 7 and 8 are provided with respective drains 10 and 11.

The gases are subsequently impelled to a washing and cooling column 12 by means of a blower 13 and are caused to circulate through the $CO_2$ absorption column or columns 14 wherein that gas is picked up in the form of a carbonated solution. These columns 14 are filled with ceramic material, and the gases circulate therein against a stream of alkaline lye solutions (monoethanolamine, potash, etc.). $CO_2$ is picked up and the remainder of the gases, basically nitrogen, are left to pass through the outlet 14a as indicated by stream 15.

The carbonated solution is regenerated by means of intermediate steam or fluid at 125°-130° C. with $CO_2$ evolving. That solution is impelled by a pump 16 to pass through the heat exchanger 17 and stripper 18 to the absorption column 14 and thus endlessly repeating this cycle. Steam 5 passes to the boiler 19 from the heat exchangers 7, 8 and the engine 1, under its own pressure. Pump 20 impels the solution from the boiler 19 to the heat exchanger 17 and from this to the stripper 18 as indicated at 80. $CO_2$ issues at the stripper outlet 21. In this manner, separation of the two gases to be obtained is effected.

Pure $CO_2$ obtained by regenerating the alkaline solution, is cooled from 100° to 40° C. within the cooler 22, purified in the purifier 23, filtered in filter 24 and compressed by compressor 25 to a minimum pressure of 12 Bar. $CO_2$ is finally cooled once more in the cooler 26 and dried in the dehydrator 27 until a moisture content of 8-10 ppm, as required for its liquefaction under cold exchange to a temperature of about −40° C. Liquid $CO_2$ at this minimum pressure is stored in containers suitable for dispatching to the trade.

The energy consumption of the present liquid $CO_2$ recovering or producing method is 400 KW per ton of produced $CO_2$, and the fuel required in the gas engine or turbine is 500 $Nm^3$ natural gas, the engine or turbine generating at the same time 2000 KWh of electric energy.

The steam required in this procedure is 4000 Kg per ton of produced $CO_2$ and is generated by recovering the heat of the combustion gases and the machine refrigeration. There is thus obtained a 1600 KWh surplus to be used in the following step of the procedure.

Once the $CO_2$ has been stripped off, the gas stream 15 having a nitrogen content higher than 99% passes through following steps for decarbonizing at 28, deoxygenation at 29, final purification at 30, drying at 31, and compression at 32 for its pipeline supply to neighbour plants where it is to be used as an inert gas.

About 5000 Kg nitrogen, in addition to the already recovered 1000 Kg $CO_2$, are generated from each 500 $Nm^3$ of which 60% are distributed as an inert gas, and 40% is typically liquified and distributed afterwards for frigorific applications. The energy needed for such nitrogen liquifying and compressing procedures corresponds with the remaining 1600 KWh of the $CO_2$ recovering procedure.

It is to be understood from the above description that the method of the invention aims to take the maximum advantage from the fuel energy, with an efficiency in the range of 85% and simultaneous recovering of the combustion gases, with an efficiency higher than 85% as well, with the only losses corresponding to the radiation heat and to the extraction of small amounts of residual gases as a result of the ventings effected in the gas purification steps, in no case higher than 15% of the main stream.

Hence, it must be emphasized that $CO_2$, and nitrogen as well, is thoroughly recovered from the combustion gases through chemical and physical procedures and using the benefit of the combustible contributed energy.

The method is concerned with the joint recovery of $CO_2$ and $N_2$, but could also be employed by recovery of only one of the above gases.

The apparatuses and plants used in practicing the described method, and, in general, all of the ancillary details than might come in account, may be varied, provided that they do not alter, change or modify the essentials of the invention.

We claim:

1. In the method of obtaining $CO_2$ and $N_2$ from hot combustion exhaust gas, the steps that include:
   (a) recovering heat from the hot exhaust gas, thereby to cool the gas,
   (b) stripping $CO_2$ from the cooled gas and compressing and liquifying the $CO_2$,
   (c) thereafter purifying the remaining cooled gas to remove contaminates, thereby to recover pure $N_2$, and compressing and liquifying said $N_2$,
   (d) the energy required for said (b) and (c) steps being derived from said (a) step heat recovery.

2. The method of claim 1 wherein all of the energy required from said (b) and (c) steps is wholly obtained from (a) step recovery, the hot exhaust gases derived from at least one of the following:
   (i) internal combustion engine exhaust gases
   (ii) gas turbine exhaust gases 3. The method of claim 2 including the steps of operating the engine or turbine by using natural gas or fuel in the operation thereof.

4. The method of claim 3 wherein about 1,000 Kg $CO_2$ and about 5,000 Kg $N_2$ are obtained from every 500 $Nm_3$ of natural gas.

5. The method of claim 1 wherein the hot exhaust gas is cooled from about 500° to 600° C. to about 150° to 170° C. during said heat recovery step.

6. The method of claim 1 including employing a gas holder zone to receive the gooled gas, prior to said (b) step.

7. The method of claim 6 wherein the gas pressure within said holder zone is about 0.05 Bar.

8. The method of claim 1 wherein said $CO_2$ stripping step includes washing and cooling the gas in a column, and circulating the gas through a $CO_2$ absorption column wherein carbonated solution is formed.

9. The method of claim 8 wherein the exhaust gas is cooled from about 150° C. to about 50° to 60° C. within the washing and cooling column.

10. The method of claim 8 wherein $CO_2$ is stripped from the carbonated solution outside the column, and the solution is re-heated by means of heat recovered from the hot exhaust gas, and then re-cycled to the column.

11. The method of claim 10 wherein heat recovered from the hot exhaust gas is transferred to steam which is employed in a heat exchanger to heat the carbonated solution.

12. The method of claim 8 wherein $CO_2$ leaves the lower portion of the column in said solution, and gas consisting of essentially of $N_2$ leaves the upper portion of the column, the $N_2$ being subsequently decarbonized, deoxygenated, dried and compressed for supply to users.

13. The method of claim 1 wherein the energy efficiency is about 85%.

14. A method for obtaining $CO_2$ and $N_2$ from the gases generated in an internal combustion engine or turbine burning hydrocarbons and generating electricity, steam and/or hot water and combustion gases, the method consisting of recovering heat contained in the combustion gases in a first heat exchanger or boiler, recovering the heat evolved by the engine or turbine as steam and/or hot water, leading the previously cooled, in a second heat exchanger, combustion gases to a pressure gas holder, impelling the said gases to a washing and cooling column, causing the gases to circulate through a $CO_2$ absorption column or columns wherein $CO_2$ is picked up as a carbonated solution while the remainder of the gases, essentially $N_2$, flowing from the column or columns, regenerating the carbonated solution to receive $CO_2$ therefrom, subjecting the $CO_2$ to compression, liquifying and drying phases, subjecting the $N_2$ to decarbonizing, deoxygenation, purification, drying compression and liquifying steps, the entire procedure for obtaining the $CO_2$ and $N_2$ using only the energy contained in the steam and/or hot water and the combustion gases, thus thoroughly recovering the said combustion gases by virtue of the benefit of the energy contributed by the hydrocarbons.

15. A method for obtaining $CO_2$ and $N_2$ from the gases generated in an internal combustion engine or turbine, according to claim 14, characterized by the fact that the hydrocarbon used as a fuel is natural gas.

16. A method for obtaining $CO_2$ and $N_2$ from the gases generated in an internal combustion engine or turbine, according to claim 14, characterized by the fact that the combustion gas temperature drops from 500°–600° C. to 150°–170° C. in the first heat exchanger.

17. A method for obtaining $CO_2$ and $N_2$ from the gases generated in an internal combustion engine or turbine, according to claim 14, characterized by the fact that the gas pressure within the gas holder is about 0.05 Bar.

18. A method for obtaining $CO_2$ and $N_2$ from the gases generated in an internal combustion engine or turbine, according to claim 14, characterized by the fact that the gas temperature drops from 150° C. to 50°–60° C. within the washing and cooling column.

19. A method for obtaining $CO_2$ and $N_2$ from the gases generated in an internal combustion engine or turbine, according to claim 15, characterized by the fact that about 1000 Kg $CO_2$ and about 5000 Kg $N_2$ are obtained from every 500 $Nm^3$ of natural gas used as fuel.

20. A method for obtaining $CO_2$ and $N_2$ from the gases generated in an internal combustion engine or turbine, according to claim 14, characterized by the fact that the energy efficiency is in the range of 85%, the only energy losses being those corresponding to the radiation heat.

21. A method for obtaining $CO_2$ and $N_2$ from the gases generated in an internal combustion engine or turbine, according to claim 14, characterized by the fact that recovering of combustion gases is higher than 85%, the only losses being due to ventings at the gas purifying stages.

* * * * *